United States Patent [19]

Shimizu

[11] Patent Number: 4,608,476
[45] Date of Patent: Aug. 26, 1986

[54] RETRACTION CONTROL FOR 3D-PATH CONTROLLED GENERIC ELECTRODE ELECTROEROSION

[75] Inventor: Akihiko Shimizu, Kanagawa, Japan
[73] Assignee: Japax Incorporated, Kanagawa, Japan
[21] Appl. No.: 534,591
[22] Filed: Sep. 22, 1983
[51] Int. Cl.⁴ .......................... B23H 7/26; B23H 7/14
[52] U.S. Cl. ............................ 219/69 M; 204/129.25; 204/129.5; 219/69 G; 219/69 S; 219/69 U
[58] Field of Search ..................... 219/69 M, 69 G, 68, 219/69 R, 69 U, 695; 204/129.25, 129.5, 129.7

[56] References Cited

U.S. PATENT DOCUMENTS

| | | | |
|---|---|---|---|
| 3,581,045 | 5/1971 | Panschow et al. | 219/69 G |
| 4,135,070 | 1/1979 | Pfau et al. | 219/69 G |
| 4,310,742 | 1/1982 | Pfau | 219/69 M |
| 4,365,133 | 12/1982 | Inoue | 219/69 M |
| 4,366,360 | 12/1982 | Inoue | 219/69 M |

FOREIGN PATENT DOCUMENTS

| | | | |
|---|---|---|---|
| 156669 | 12/1980 | Japan | 219/68 |
| 152525 | 11/1981 | Japan | 219/69 G |
| 2085788A | 5/1982 | United Kingdom | 204/129.5 |

Primary Examiner—Clarence L. Albritton
Assistant Examiner—Geoffrey S. Evans
Attorney, Agent, or Firm—Karl F. Ross; Herbert Dubno

[57] ABSTRACT

In a generic-electrode NC-EDM process, the electrode tool oriented in the direction of a z-axis is translationally retracted, from a position of a defective gap condition on a prescribed two-dimensional feed path in an x-y plane, by a prescribed distance in a prescribed direction which is transverse generally to all of the x-y, y-z and z-x planes so that the electrode end portion with a generic form is removed from the machined surfaces adjacent the machining gap of the defective condition. This retraction displacement may be performed under numerical control by displacing the electrode tool translationally by a first predetermined distance in an x-y plane and orthogonally to a portion of the feed path which is immediately prior to that position and simultaneously retracting the electrode axially in the direction of the z-axis by a second predetermined distance.

11 Claims, 6 Drawing Figures

RETRACTION CONTROL FOR 3D-PATH CONTROLLED GENERIC ELECTRODE ELECTROEROSION

FIELD OF THE INVENTION

The present invention relates to a method of and apparatus for controlling a 3D-path controlled generic-electrode electroerosion process and, more particularly, to remedying a machining gap defective condition in such an electroerosion process.

BACKGROUND OF THE INVENTION

In the electroerosion process referred to, a generic electrode, i.e. an axial or slender electrode tool having an end portion of a generic electrode form, i.e. a simple transverse cross-sectional contour (e.g. circular or square) generally independent of a form to be imparted to a workpiece, is brought into electroerosive machining relationship with the workpiece. The electrode is displaced relative to the workpiece to advance the end portion in a scanning manner or effectively in the workpiece sequentially along successive two-dimensional programmed feed paths, the paths lying in parallel planes which are spaced by a small distance in a third direction, i.e. in the direction of an axis of the electrode tool. An electroerosive machining gap is maintained between the advancing end portion and the workpiece to progressively develop in the latter, a 3D (three-dimensional) machined form corresponding to the successive two-dimensional feed paths as a whole. Conveniently, the 3D-path control is performed by a NC (numerical control) system under programmed path data instructions.

This process has several advantages over the conventional sinking electroerosion process. First, the need to prepare duplicating (complementary) tool electrodes, which must be commonly plural for a single forming operation, is eliminated. Second, a relatively high machining accuracy is obtainable at a relatively high removal rate, viz. even under a "wear" machining condition. Furthermore, the accumulation of discharge products such as removed particles and decomposed gases, an extremely serious problem in the sinking problem, is much less likely to occur, and hence there is less tendency towards short-circuiting, arcing or like abnormal discharge which results in thermal damage to the workpiece or the electrode tool or both.

When, however, such a gap defective condition, which is not completely avoidable in this process as well, happens to develop, the remedy is to extinguish the abnormal discharge and remove the defective condition promptly so that the damage may not occur. This can be achieved partly by terminating the electrical energization in the machining gap by cutting off the supplied machining pulses temporarily but it has been found that this measure is often insufficient to prevent the damage especially where the gap contains a significant amount of the machining detritus which remains unremoved.

Thus, in order to extinguish the arcing condition or short-circuiting not merely temporarily but permanently, it is desirable to expand the machining gap or to move apart the electrode tool and the workpiece temporarily apart so that the accumulated machining detritus can be pumped out of the gap promptly. Thus, it has been suggested to axially retract the electrode tool temporarily away from the workpiece as in the conventional sinking process, to temporarily retract the electrode tool along its preceding path of travel as in the traveling-wire electroerosion process, or to use a combination of such tool retractions. It has been found that none of these modes of tool retractions will necessarily remedy the defective gap condition adequately in the 3D-path controlled generic-electrode electroerosion process.

OBJECTS OF THE INVENTION

The present invention, accordingly, seeks to provide a new and effective method which remedies a defective gap condition in a 3D-path controlled, especially a numerically controlled, generic-electrode electroerosion process and also to provide an apparatus which is suitable to carry out the method described.

SUMMARY OF THE INVENTION

In accordance with the present invention there is provided, in a first aspect thereof, a method of controlling a 3D-path controlled generic-electrode electroerosion process wherein an axial electrode tool having an end portion with a generic electrode form spacedly juxtaposed with a workpiece and arranged to establish an electroerosive machining relationship therewith across a machining gap is displaced generally translationally relative to the workpiece to advance that end portion effectively in the workpiece sequentially along successive two-dimensional paths programmed in respective sequential planes which are in mutually parallel relationship in a third dimensional direction or in the direction of an axis of the electrode tool, while maintaining the electroerosive machining relationship of the said end portion with the workpiece to progressively develop in the latter a three-dimensional machined form corresponding to the said successive two-dimensional feed paths as a whole, which method comprises the steps of: while the electrode tool end portion is advancing along a said programmed two-dimensional path in the corresponding plane, (a) monitoring the machining gap between the advancing electrode end portion and the workpiece to detect a defective condition therein and producing a control signal in response to the detected condition; and (b) in response to the control singal, retracting, from a position of the defective gap condition, the electrode tool generally translationally by a prescribed distance in a prescribed direction which is inclined to the axis of the electrode tool and transverse, preferably orthogonal, to a portion of said programmed feed path which is immediately prior to the said position such that the electrode end portion is removed from machined surfaces of the workpiece adjacent the machining gap of the defective condition; and (c) returning the retracted electrode tool to restore the end portion to the said position relative to the workpiece.

It is desirable that the prescribed direction be substantially normal to the developing three-dimensional form at the aforementioned position. Thus, it is preferable that the prescribed direction be substantially orthogonal to the said portion of the feed path.

According to preferred features of the invention, (d) the cycle of steps (b) and (c) is repeated, i.e. a predetermined number of times or until the defective condition disappears. The latter can be performed by (e) conducting step (a) at an end of each of the repetitive cycles and (f), in response to disappearance of the defective condition when ascertained in step (e), terminating the step (d).

Furthermore, it may be desirable that a plurality of values be set for the said prescribed distance so that one of these values may be selected in the step (d) depending upon a particular magnitude of the defective condition detected in step (a).

Specifically the step (b) is carried out by (b1) relatively displacing the workpiece and the advancing electrode tool generally translationally by a first predetermined distance in a first predetermined direction which is transverse in the said plane to the said portion of the feed path and simultaneously (b2) relatively retracting the workpiece and the electrode tool by a second predetermined distance in a second predetermined direction which is orthogonal to the said plane so that the electrode tool is eventually retracted relative to the workpiece translationally by the said prescribed distance in the said prescribed direction. Preferably, the first predetermined direction is substantially orthogonal to the said portion of the feed path. Also, the first predetermined distance is substantially equal to a programmed distance of the said portion of the feed path. Specifically, the programmed distance is a sum of successive incremental distances and step (b1) is carried out by translationally displacing the electrode tool by the first predetermined distance as a sum of the successive incremental distances in the reverse order, each individually rotated by a right angle.

The invention also provides an apparatus for controlling a 3D-Path controlled generic-electrode tool electroerosion process as described, which apparatus comprises: means for monitoring the machining gap between the workpiece and the end portion of the electrode tool advancing relative thereto along a said programmed two-dimensional feed path in the corresponding plane to detect a defective condition in the said gap and producing a control signal in response to the detected condition; and means responsive to the control signal for retracting, from a position on said feed path, the electrode tool generally translationally relative to the workpiece by a prescribed distance in a prescribed direction which is inclined to the axis of the electrode tool and transverse, preferably orthogonal, to a portion of said two-dimensional feed path which is immediately prior to that position such that the electrode tool end portion is removed from machined surfaces of the workpiece adjacent the machining gap of the defective condition and for returning the retracted electrode tool relative to the workpiece to restore the end portion to the said position.

BRIEF DESCRIPTION OF THE DRAWING

These and other features of the present invention as well as advantages thereof will become more readily apparent from the following description when taken with reference to the accompanying drawing in which.

SPECIFIC DESCRIPTION

Figure 1:
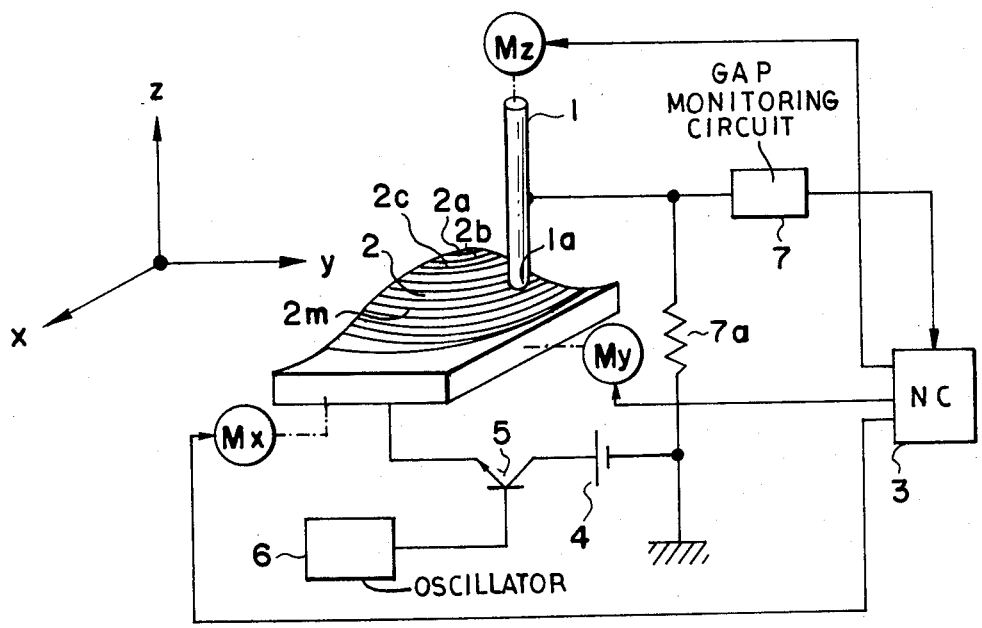
FIG. 1 is a schematic view, partly perspective and partly in a block diagram form, illustrating a numerically 3D-path controlled generic-electrode electroerosion system incorporating the principles of the present invention.

Referring now to FIG. 1 there is shown at 1 a generic electrode tool, i.e. an electrode tool having an end portion 1a of a generic form for spaced juxtaposition with a workpiece 2 to define a machining gap therewith. The generic electrode tool 1 is an axial body such as a uniform slender rod, being simple in its transverse cross-sectional contour, e.g. circular or square, and being generally independent in shape of a three-dimensional form to be machined in the workpiece. Thus, the simple electrode end portion is typically much smaller than the blank body to be machined which may be relatively large and intricate in shape. Such machined form is shown as a convexed contour in FIG. 1.

In the feed-path 3D-controlled electroerosion process the axial electrode tool 1 is translationally displaced relative to the workpiece 2 to advance the electrode end portion 1a three-dimensionally in a scanning manner in and over the workpiece 2. The scanning three-dimensional path is defined by a succession of two-dimensional paths 2a drawn in the workpiece 2 so as to collectively constitute the desired three-dimensional form. The successive paths 2a are defined in successive, spaced parallel planes, respectively.

In the illustrated arrangement the generic electrode tool 1 is held oriented vertically or in the direction of a z-axis while the workpiece 2 is supported to extend horizontally or in an x-y plane which is orthogonal to the z-axis. The electrode tool 1 is supported on a conventional support member (not shown) which is drivingly coupled with a z-axis motor Mz, e.g. a stepping motor, to displace the electrode tool 1 in the direction of the z-axis. The workpiece 2 is securely held in a worktank (not shown) supported on a cross-table (not shown). The cross-table is drivingly coupled with an x-axis feed motor Mx, e.g. a stepping motor and a y-axis feed motor Mz, e.g. a stepping motor, to displace the workpiece 2 horizontally or in the x-y plane. The feed data for the x-y paths and z-axis displacements are stored and programmed in an NC (numerical control) unit 3 and processed therein to energize the motors Mx, My and Mz so that there effectively results a translational displacement of the electrode tool 1 relative to the workpiece 2 to advance the electrode end portion 1a sequentially along the successive, programmed two-dimensional paths. Each time one of the successive two-dimensional paths is completed, the z-axis motor Mz is energized under a programmed command of the NC unit 3 to reposition the electrode tool 1 along the z-axis to shift the end portion 1a by a prescribed small distance vertically. This shift step followed by a two-dimensional feed step is repeated until the final programmed two-dimensional feed path is reached.

During the three-dimensional displacements, the machining gap is kept flooded with a liquid dielectric and a series of electrical discharges are effected between the advancing electrode end portion 1a and the workpiece 2 to electroerosively remove material from the workpiece 2 across the gap. The machining power supply for effecting the electrical discharges comprises a DC source 4 and a power switch 5 connected in series therewith to the electrode tool 1 and the workpiece 2, the switch being alternately turned on and off by means of an oscillator or signal pulser 6 to apply a series of electrical pulses across the gap.

Figure 2:
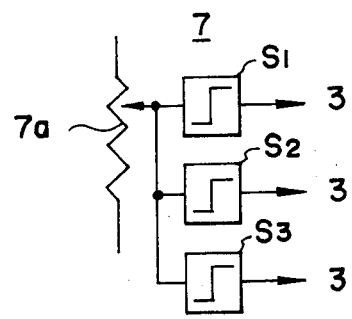
FIG. 2 is a circuit diagram of a modification of a portion of the system shown in FIG. 1.

The discharge circuit includes a sensing resistor 7a as a part of a gap monitoring circuit 7. The purpose of the circuit 7 here is to monitor the machining gap and respond to the development of a defective condition therein, e.g. an arcing and/or short-circuiting condition, to produce a control single which is fed into the control unit 3 to perform a gap remedying action as will be described hereinafter. In this connection, either or both of the gap voltage and current may be sensed on average or on a per pulse basis in a known manner to detect such a defective condition in the gap. The monitoring circuit 7 may, as shown in FIG. 2, be designed to provide a plurality of control signals depending upon the particular extents of the gap defective condition. To this end, for example, a plurality of Schmitt-trigger circuits or like discriminators S1, S2, S3 having different threshold levels may be connected to the sensing resistor 7a to provide control signals depending upon particular magnitudes of the voltage which develop thereacross responsive to the particular extend of the gap defective condition.

Figure 3:
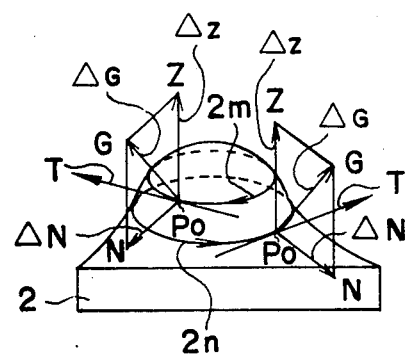
FIG. 3 is a perspective view diagrammatically illustrating a workpiece in which a convex 3D-form is being machined by the system of FIG. 2, and a vector in which the generic electrode tool is retracted from the workpiece according to a preferred embodiment of the invention.
Figure 4:
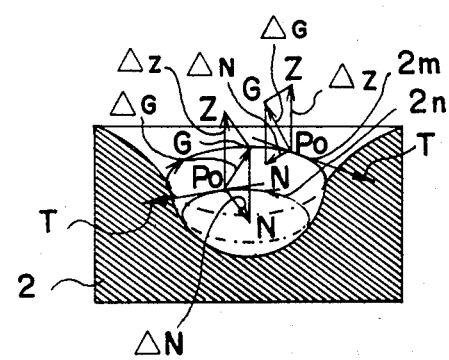
FIG. 4 is a view similar to that of FIG. 3 illustrating such a vector in conjunction with a concave 3D-form being machined in a workpiece.

FIGS. 3 and 4 show respectively a convex form and a concave form or cavity being machined in the workpiece 2 with the generic electrode tool 1.

In operation the end portion 1a will advance along one of the two-dimensional paths (2m, 2n) in the corresponding plane. When a gap defective condition is detected by the gap monitoring unit 7, the generic electrode tool 1 is displaced from a position P0 in which the defective condition occurs by a prescribed distance $\Delta G$ in a prescribed direction G which is inclined to the axis (Z) of the electrode tool 1 and transverse to a portion of the prescribed two-dimensional path 2m, 2n followed immediately prior to the position P0 such that the end portion 1a is removed from machined surfaces of the workpiece 2. The moved electrode is thereafter returned to restore the end portion 1a to the position P0 relative to the workpiece 2. Preferably, the prescribed direction G is substantially normal to the developing three-dimensional form at the position P0, or substantially orthogonal to that portion of the feed path 2m, 2n and hence to a tangent, T thereof at the position P0.

The required translational movement or retraction of the generic electrode tool can effectively be achieved by causing the electrode tool 1 to be displaced by a first predetermined distance $\Delta N$ in a first predetermined direction N which is orthogonal or substantially orthogonal in that plane (x-y) to that portion of the feed path (2m, 2n) and substantially simultaneously causing the electrode tool 1 to be retracted by a second predetermined distance $\Delta Z$ axially in a second predetermined direction (Z) which is orthogonal to the x-y plane so that the electrode tool 1 is eventually retracted by the prescribed distance $\Delta G$ in the prescribed direction G.

The first and second predetermined distances $\Delta N$ and $\Delta Z$ are, in one practical example, substantially equal to each other so that the eventual prescribed direction G lying in this case in a plane orthogonal to the x-y plane is inclined to that portion of the feed path with an angle of 45°.

Figure 5:
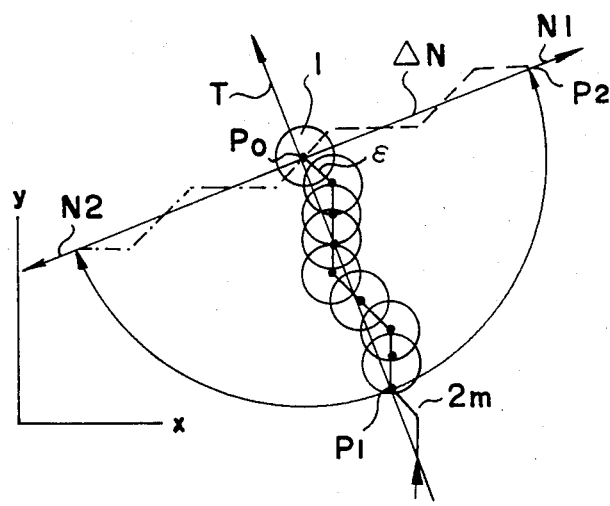
FIG. 5 is a diagrammatic plane view of a two-dimensional feed path followed in an x-y plane by the axis of a generic electrode tool and the two-dimensional component of path of retraction thereof to be followed in the system of FIG. 1 according to a preferred embodiment of the invention.

The axial displacement of the generic electrode tool 1 is achieved by actuating the motor Mz whereas the translational displacement is performed by operating the motors Mx and My. FIG. 5 shows an example of how the latter displacement may be carried out.

In FIG. 5, the axis of the generic electrode 1 is shown advancing along a feed portion path 2m generally in the direction of a tangent T in the x-y plane. The feed path 2m comprises a succession of programmed incremental displacements each of which has a distance $\epsilon$. From a point P1 to the point P0 it is seen that the axis has traveled eight successive increments. Now assume that the form being generated in the workpiece is, in altitude, high on the left-hand side and low on the right-hand side with respect to the feed path 2m or direction T and that a gap defective condition is detected at the position P0. The axis of the electrode tool 1 is then displaced translationally in the x-y plane in the direction of N1 which is orthogonal to the direction T on the right-hand side of the path 2n or T and such that the electrode end portion 1a is removed away from the machined surfaces of the workpiece 2. To this end, displacement data for the eight preceding increments $\epsilon$ is memorized up to the position P0, reproduced, individually rotated by +90° and then followed in the reversed order to translationally displace the axis of the electrode tool 1 by the distance $\Delta N$ in the direction of N1. The retracted electrode is returned by following the path of retraction in the reverse direction to the position P0.

Figure 6:
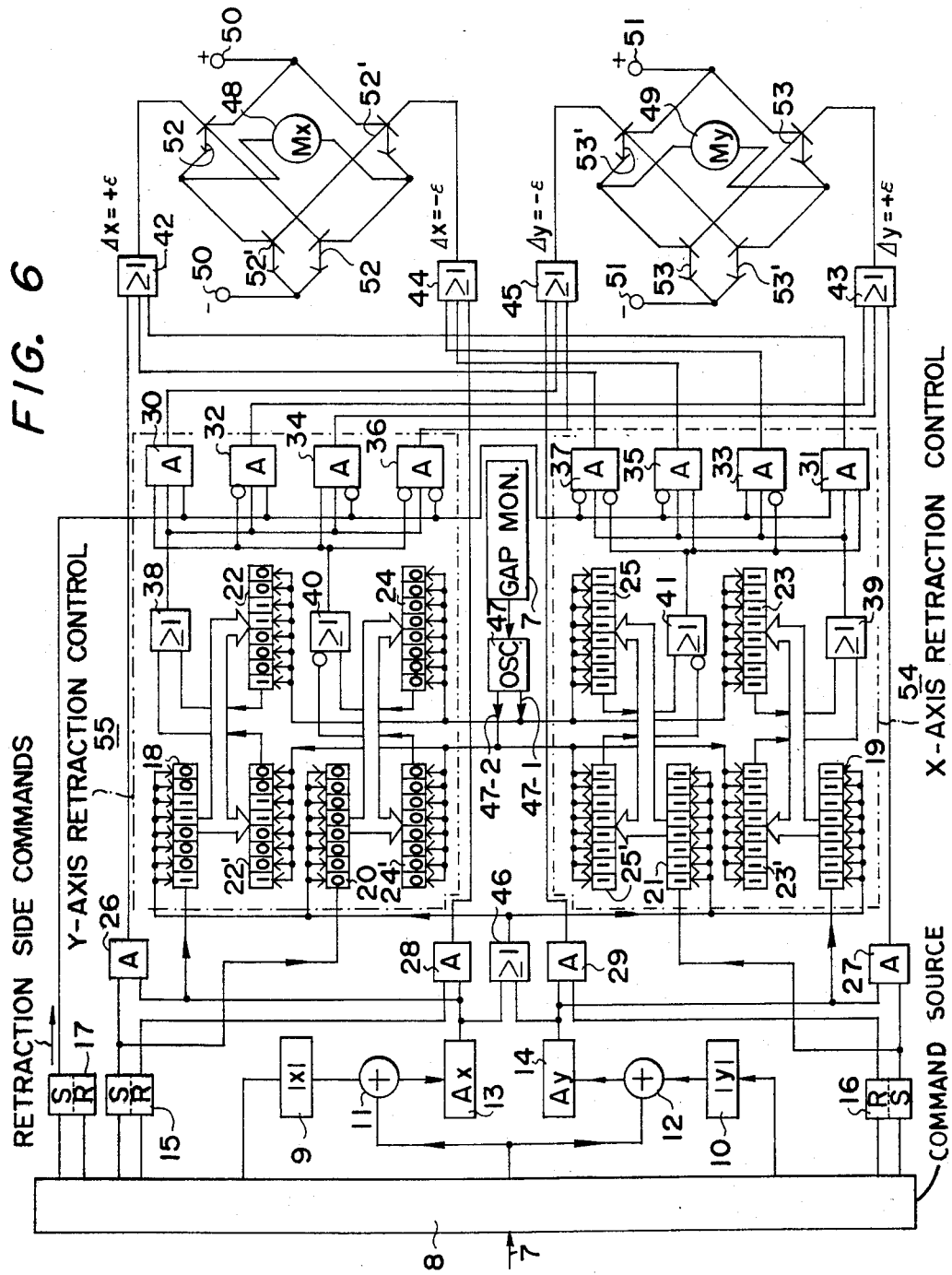
FIG. 6 is a circuit diagram essentially in a block form illustrating an NC system for performing the path control of FIG. 2 in embodying a method according to the present invention.

FIG. 6 shows a control system utilizing the aforementioned principles of the present invention. The system has a numerical control arrangement associated with three drive motors Mx(48), My(49) and Mz are previously described and includes a command source 8. Associated with the command source 8 is a conventional NC scheme are a pair of registers 9 and 10 for coordinate variables x and y to be integrated, and a pair of adders 11 and 12 to combine the outputs of the command source 8 with the outputs of the registers 9 and 10, respectively so that their outputs are fed into x-axis and y-axis accumulators 13 and 14, respectively. A pair of flip-flops 15 and 16 are also provided to store the signs of the successive x-axis and y-axis feed pulses in accordance with instructions received from the command source 8. Also included are pairs of AND gates 26, 27, 28 and 29 which combines the outputs of the accumulators 13 and 14 with the outputs of the flip-flops 15 and 16 and feed the driver circuit for the motors Mx and My as will be described.

A further flip-flop 17 is provided, to memorize the particular directional indications received from the command source 8 to determine which side of the feed path is to be taken at each commanded position thereon in translationally retracting the electrode tool 1.

The overflowing pulses from the accumulators 13 and 14 are respectively fed into and stored in the shift registers 18 and 19, respectively each of which is shown as having eight bits. Further eight-bit shift registers 20 and 21 are fed with the outputs of the flip-flops 15 and 16. Further eight-bits resisters 22, 22'; 23, 23'; 24, 24'; and 25, 25' are provided to register the data transferred from the registers 18, 19, 20 and 21.

The driver circuits for the motors 48(Mx) and 49(My) are arranged to operate in response to the outputs of four OR gates 42, 43, 44 and 45. The motor Mx(48) is energized by a power supply 50 and, when transistors 52 are turned on, is rotated in a direction such as to displace the electrode tool 1 by one increment $+\epsilon$ along the X-axis and, when transistors 52' are turned on, is rotated in a direction such as to displace the electrode tool 1 by one increment $-\epsilon$ along the x-axis. Likewise, the motor My(49) is arranged to be energized by a power supply 51 and rotated, when transistors 53 are turned on, in a direction such as to displace the electrode tool 1 by one increment $+\epsilon$ along the y-axis and when transistors 53' and turned on, in a direction such as to displace the electrode tool 1 by one increment $-\epsilon$ along the y-axis. The transistors 52, 52', 53 and 53' are turned on when the OR gates 42, 44, 43 and 45 have at their individual outputs "1", respectively.

The OR gate 42 has one input connected to the output of the AND gate 26 and one input of the AND gate 26 is connected to the output of the accumulator 13. The AND gate 26 has its other input connected to the SET terminal of the flip-flop 15. The OR gate 44 has one input connected to the output of and AND gate, and one is input of the AND gate is connected to the output of the accumulator 13. The AND gate 28 has its other input connected to the RESET terminal of the flip-flop 15. Thus it is seen that in the normal operation, each time an overflowing pulse is issued from the accumulator 13 the motor 48(Mx) is energized to displace the electrode tool by one increment e in either the positive or negative direction depending on whether the flip-flop 15 is in its SET or RESET state and thus on the particular command of the plus or minus sign issued from the controller 8.

Likewise the OR gate 43 has one input leading from the output of the AND gate 27 whose one input is fed with the output of the accumulator 14 and whose other input is connected to the SET terminal of the flip-flop 16. The OR gate 45 has one input leading from the AND gate 29 whose one input is fed with the output of the accumulator 14 and whose other input is connected to the RESET terminal of the flip-flop 16. Thus, in the normal operation, each time an overflow pulse is issued from the accumulator 14 the motor 49(My) is energized to displace the electrode tool by one increment $\epsilon$ in either the positive or negative direction depending on whether the flip-flop 16 is in its SET or RESET state and thus on the particular command of the plus or minus signal issued from the controller 8.

In this manner the axis of the electrode tool can be allowed to move along the preprogrammed two-dimensional path 2m incrementally as indicated in FIG. 5. This mode of operation itself is known and is according to conventional DDA (digital differential analyser) linear interpolation so that no further detailed explanation thereof is required.

According to the illustrated embodiment of the invention, the system is designed to include an X-axis retraction control unit 54 comprising the registers 19, 21, 23, 23', 25 and 25', the OR gates 39 and 41 and the AND gates 31, 33, 35 and 37 coupled to the two additional inputs of each of the OR gates 42 and 44; and a Y-axis retraction control unit 55 comprising the resistors 18, 20, 22, 22', 24 and 24', the OR gates 38 and 40 and the AND gates 30, 32, 34 and 36 coupled with the two additional inputs of each of the OR gates 43 and 45.

The registers 18 and 19 are fed with overflow pulses from the accumulators 13 and 14, respectively. The registers 20 and 21 are fed with the outputs of the flip-flops 15 and 16, respectively. The output of the OR gate 46 has its inputs connected with the outputs of the accumulators 13 and 14 and is used to shift data in the registers 18, 19 and 21, each of which is shown as having eight bits.

It will be seen, therefore, that the registers 18 and 20 have registered therein the latest eight successive outputs of the accumulator 13 and those of the flip-flop 15, respectively. Likewise, the registers 19 and 20 have registered therein the latest eight successive outputs of the accumulators 14 and those of the flip-flop 16, respectively. The particular indications of binary digital data shown registered in the respective eight bits of the registers 18, 19, 20 and 21 are these registered outputs corresponding to the eight incremental steps of displacement of the axis of the electrode tool 1 from the position P1 to the position P0 shown in FIG. 5. Of course, the data stored in the registers 18 and 19 are the data for the components of the incremental displacements along the x-axis and y-axis, respectively whereas the data stored in the registers 20 and 21 are the data defining the plus or minus direction sign of the component displacements along these axes.

Thus, for example, the number "1" in any one bit of the register 18 shows that the unit displacement $\epsilon$ was made along the x-axis in the corresponding step. The number "0" in any one bit of the register 18 shows that no displacement was made along the y-axis in the corresponding step. The number "1" in any one bit of the register 20 or 21 shows that the displacement if made was in the positive direction in the corresponding step. The number "0" in the register 20 or 21 shows that the displacement if made was in the negative direction.

Each time the data in the registers 18; 19; 20; and 21 are renewed, the latest data therein are transferred to the registers 22, 22'; 23, 23', 24, 24'; and 25, 25', respectively, each of which has eight bits. The registers 22–25 registers store therein the latest eight successive transferred data for reproduction through its output in an order opposite to that in which they are entered. The registers 22'–25' have registered therein the data for reproduction in the same order of entry. However, those reproductions will not occur as long as their shift terminals remain deenergized, viz. as long as machining proceeds under normal conditions.

When a defective condition is detected in the machining gap, the monitoring unit 7 issues a control signal which on the one hand is applied to the controller 8 to terminate its programmed processing operation and on the other hand acts to actuate the oscillator 47. The oscillator 47 when actuated feeds the first eight pulses through its first output terminal 47 - 1 and then its next eight pulses through its second output terminal 47 - 2. The initial eight pulses are fed to the registers 22, 23, 24 and 25 and the subsequent eight pulsels are fed to the registers 22', 23', 24', 25'. The registers 22–25 act on the motors 48(Mx) and 49(My) to translationally retract the electrode tool in the x-y plane and the registers 22'–25' act on these motors to return the electrode tool upon retraction.

As the initial eight pulses from the second output terminal 47 - 1 of the oscillator 47 successively come in, each of the registers 22–25 individually issues the registered data in succession retrospectively. The issued data signals from the register 22 pass through the OR gate 38 for direct entry into a first selection logic circuit comprising AND gates 30, 32, 34 and 36. The issued data signals from the register 24 pass through the OR gate 40 to enter directly into the AND gates 30 and 34 and upon inversion into the AND gates 32 and 36. The issued data signals from the register 23 pass through the OR gate 39 for direct entry into a second selection circuit comprising AND gates 31, 33, 35 and 37. The issued data signals from the register 25 pass through the OR gate 41 to enter directly into the AND gates 31 and 35 and upon inversion into the AND gates 33 and 37. The AND gates 30-37 are also connected through their inputs to the output of the flip-flop 17 which, when commanded with a "go right" signal from the controller 8, provides a "1" output and, when with a "go left" signal, provides a "0" output. Such an output is shown as being fed directly into the AND gates 30, 31, 32 and 33 and as being fed upon inversion into the AND gates 34, 35, 36 and 37. The outputs of the AND gates 32 and 34 in the first selection logic circuit are fed through the OR gates 43, thus to energize the motor 49(My) so as to displace the electrode tool 1 by $+\epsilon$. The outputs of the AND gates 30 and 36 in the first selection logic circuit are fed through the OR gate 45, thus to energize the motor 49(My) so as to displace the electrode tool 1 by $-\epsilon$. The outputs of the AND gates 31 and 37 in the second selection logic circuit are fed through the OR gate 42, thus to energize the motor 48(Mx) so as to displace the electrode tool by $+\epsilon$. The outputs of the AND gates 33 and 35 in the second selection logic circuit are fed through the OR gate 44, thus to energize the motor 48(Mx) so as to displace the electrode tool by $-\epsilon$. In this manner the electrode tool 1 is translationally retracted from the position P0 to the position P2 in the direction of N1 in the x-y plane as shown in FIG. 5.

Thereupon, as the subsequent eight pulses from the second output terminal 47 - 2 of the oscillator 47 successively come in, each of the registers 22'-25' individually feeds out the stored data in succession in the order of storage. The issued data signals from the register 22' pass through the OR gate 38 for direct entry into the AND gates 30, 32, 34 and 36. The issued data signals from the register 24' pass upon inversion through the OR gate 40, the inverted signals being fed directly into the AND gates 30 and 34 and upon re-inversion into the AND gates 32 and 36. The issued data signals from the register 23' pass through the OR gate 39 for direct entry into the AND gates 31, 33, 35 and 37. The issued data signals from the register 25' pass upon inversion through the OR gate 41, the inverted signals being fed directly into the AND gates 31 and 35 and upon re-inversion into the AND gates 33 and 37. The logically processed outputs which thus issues from the AND gates 30-37 pass through the OR gates 42-45 to energize motors 48(Mx) and 49(My) so as to return the retracted electrode tool 1 from the position P2 to the position P0 along the incremental paths along which it was retracted.

It should be apparent, therefore, that the x-axis retraction control 54 converts y-axis data (pulses) for the past eight successive steps of machining feed displacement individually into x-axis data (pulses) both for retraction and return movements of the electrode tool 1. Likewise, the y-axis retraction control 55 converts x-axis data (pulses) for those steps individually into y-axis data (pulses) both for those movements. As previously described, data as to which side, i.e. right-hand or left-hand side, of the machining feed path the electrode tool should be retracted towards are programmed in the controller 8 at each position P0 and reproduced at the flip-flop 17 whose output is fed into the AND gates 30-37 to complete the precise conversion controls. The individual modes of the data conversions performed by the retraction control units 54 and 55 at the output logic stage 30-37 are represented in the table below, which shows how a machining feed pulse should be converted into a retraction pulse and a return pulse when the retraction should be (1) to the right-hand side or (2) to the left-hand side of the machining feed path at a given point P0 thereon.

TABLE 1

| Machining Feed Pulse | Retraction Control Pulses | | | |
|---|---|---|---|---|
| | Retraction Pulse | | Return Pulse | |
| | To Right (1) | To Left (2) | To Right (2) | To Left (1) |
| x = +1 | y = −1 | y = +1 | y = +1 | y = −1 |
| x = −1 | y = +1 | y = −1 | y = −1 | y = +1 |
| y = +1 | x = +1 | x = −1 | x = −1 | x = +1 |
| y = −1 | x = −1 | x = +1 | x = +1 | x = −1 |

In the Table above, $x=+1$ represents a displacement $\epsilon$ along the x-axis in the positive direction, $x=-1$ represent a displacement $\epsilon$ along the x-axis in the negative direction, $y=+1$ represents a displacement $\epsilon$ along the y-axis in the positive direction and $y=-1$ represents a displacement $\epsilon$ along the y-axis in the negative direction.

From the Table it is seen that when the retraction should be to the right-hand side, $x=+1$ and $x=-1$ are converted into $y=-1$ and $y=+1$, respectively, for the retraction displacement and into $y=+1$ and $y=-1$, respectively, for the return displacement. When the retraction should be to the left-hand side, $x=+1$ and $x=-1$ are converted into $y=+1$ and $y=-1$, respectively, for the retraction displacement and into $y=-1$ and $y=+1$, respectively, for the return displacement. Likewise, $y=+1$ and $y=-1$ when the retraction should be to the right-hand side are converted into $x=+1$ and $x=-1$, respectively, for the retraction displacement and $x=-1$ and $x=+1$, respectively, for the return displacement. When the retraction should be to the left-hand side, $y=+1$ and $y=-1$ are converted into $x=-1$ and $x=+1$, respectively, for the retraction displacement and into $x=+1$ and $x=-1$, respectively, for the return displacement.

When the retraction should be to the right-hand side, the flip-flop 17 is in its set state, disabling the output of the OR gate 38, 40 to pass through the AND gate 34, 36 and permitting it to pass only through the AND gate 30, 32. Then, when the output of the OR gate 38 is "0", i.e. in the absence of a displacement along the y-axis, the AND gates 30 and 32 both have "0" output to hold the motor 49(My) at standstill. When the OR gate 38 has "1" output, the motor 49(My) is driven by one step in either a positive or a negative direction depending on the output of the OR gate 40. When the OR gate 40 has "1" output, i.e. $x=+1$, the AND gate 30 will have "1" output which will in turn drive the motor 49(My) in the negative direction. This means that $x=+1$ is converted into $y=-1$.

The z-axis motor Mz shown in FIG. 1 and its control previously described are not shown in FIG. 6 for the sake of simplicity. It should be noted that the driver circuit for the z-axis motor Mz is arranged also to operate in response to the output of the gap monitoring unit 7 and may be connected to the output terminals 47 - 1 and 47 - 2 of the oscillator 47. Thus, the motor Mz may be driven in a negative direction incrementally in response to the initial eight successive pulses issuing from the terminal 47 - 1 to retract the electrode tool 1 axially. Then, to return the electrode to the position P0 in the z-axis coordinate, the motor Mz is driven in a positive direction incrementally in response to the subsequent eight successive pulses issuing from the terminal 47 - 2.

It should also be noted that the oscillator 47 is preferably designed to repetitively issue a predetermined even number of pulses, e.g. sixteen pulses, of which the first half the number to issue (e.g. eight) from the terminal 47 - 1 and the subsequent half the number (e.g. eight) to issue from the terminal 47 - 2. This allows the electrode tool 1 to be translationally retracted and returned repetitively. The number of the repetition can simply be set in the oscillator 47. The gap monitoring unit 7 may also consecutively monitor the machining gap at the end of each of the repetitive cycles of tool retraction and return and will deactuate the oscillator 47 upon disappearance of the defective condition therein.

The stroke of the tool retraction can be set by the number of pulses issuing from each of the terminals 47 - 1 and 47 - 2. The stroke can thus be variably established by rendering the number of these pulse variably selectable in response to and depending upon the particular magnitude of the gap defective condition which magnitude is readily discriminated using a detector arrangement as shown in FIG. 2. In this manner, an adaptive control of the translational tool retraction is also made possible.

What is claimed is:

1. A method of controlling a numerically 3D-path controlled generic-electrode electroerosion process wherein an axial electrode tool having an end portion of a generic electrode form is arranged to establish an electroerosive machining relationship with an electrically conductive workpiece across a machining gap defined between the end portion and the workpiece, and the electrode tool and the workpiece are relatively displaced generally translationally to advance said end portion effectively in the workpiece sequentially along successive two-dimensional feed paths programmed in respective sequential planes which are in mutually parallel relationship in a third dimensional direction or in the direction of the longitudinal axis of the electrode tool, while maintaining the electroerosive machining relationship between the advancing end portion and the workpiece to progressively develop in the latter a three-dimensional machined form corresponding to the cumulative effect of machining along said successive two-dimensional feed paths, the method comprising the steps of: while said electrode tool and end portion is advancing along each of said programmed two-dimensional paths in the corresponding plane,
   (a) monitoring said machining gap to detect a defective condition therein and producing a control signal in response to said condition;
   (b) in response to said control signal, retracting, from a position of said defective gap condition, said electrode tool and the workpiece relative to each other by a prescribed distance in a prescribed direction which is inclined to the axis of the electrode tool and substantially normal to a tangent plane to the developing three-dimensional form at said position and oblique to the respective two-dimensional path in progress; and
   (c) returning said retracted electrode tool relative to said workpiece to restore said end portion to said position.

2. The method defined in claim 1, further comprising the step of cyclically repeating the steps (b) and (c) a predetermined number of times.

3. The method defined in claim 1, further comprising the steps of (d) repeating a cycle of steps (b) and (c), (e) conducting steps (a) at an end of said cycle (d) and (f), in response to disappearance of said condition when ascertained in step (e), terminating step (d).

4. The method defined in claim 1, further comprising the steps of presetting a plurality of values for said prescribed distance and selecting, in step (b), one of said values depending upon a particular magnitude of said defective condition detected in step (a).

5. The method defined in claim 1, claim 2, claim 3 or claim 4 wherein step (b) is carried out by (b1) displacing said electrode tool generally translationally relative to said workpiece by a first predetermined distance in a first predetermined direction which is transverse to said portion of the feed path and substantially simultaneously (b2) retracting said electrode tool relative to said workpiece by a second predetermined distance in a second predetermined direction which is orthogonal to said parallel planes so that said electrode tool is eventually retracted relative to said workpiece by said prescribed distance in said prescribed direction.

6. The method defined in claim 5 wherein said first predetermined direction in step (b1) is substantially orthogonal to said portion of the feed path.

7. The method defined in claim 6 wherein said first predetermined distance in step (b1) is substantially equal to a programmed distance of said portion of the feed path.

8. The method defined in claim 7 wherein said programmed distance is a sum of successive incremental distance and step (b1) is carried out by translationally displacing said electrode tool by said first predetermined distance as a sum of said successive incremental distances in the reversed order, each individually rotated by a right angle.

9. An apparatus for controlling a numerically 3D-path controlled generic-electrode electroerosion process wherein an axial electrode tool having an end portion of a generic electrode form is positioned to face an electrically conductive workpiece and arranged to establish an electroerosive machining relationship therewith across a machining gap defined between said end portion and the workpiece, and the electrode tool and the workpiece are relatively displaced generally translationally to advance said end portion effectively and relative to the workpiece sequentially along a succession of programmed two dimensional feed paths in respective sequential parallel planes which are in mutually parallel relationship in one of the group of a third dimensional direction and the direction of an axis of the electrode tool, while maintaining the electroerosive machining relationship between the advancing electrode end portion and the workpiece to progressively develop in the latter into a three-dimensional machined form corresponding to said successive two-dimensional feed paths as a whole, said apparatus comprising:
   means (a) for monitoring the machining gap between said workpiece and said end portion of the electrode tool as it advances along a said programmed two-dimensional feed path in the corresponding plane to detect a defective condition in said gap and producing a control signal in response to the detected condition; and means (b) responsive to said control signal for retracting, from a position of said defective condition, said electrode tool and said workpiece relative to each other by a prescribed distance in a prescribed direction which is inclined to the axis of the electrode tool and substantially normal to a plane tangent to the developing three-dimensional form at said position and oblique to a respective three-dimensional path in progress and for returning the retracted electrode tool relative to the workpiece to restore said end portion to said position.

10. The apparatus defined in claim 9 wherein said means (b) includes means (b1) responsive to means (a) for relatively displacing said workpiece and said advancing electrode generally translationally by a first predetermined distance in a first predetermined direction which is substantially orthogonal to said portion of the feed path and means (b2) operable substantially simultaneously with means (b1) for relatively retracting said electrode tool and said workpiece by a second predetermined direction which is orthogonal to said parallel planes so that said electrode tool is eventually retracted relative to the workpiece by said prescribed distance in said prescribed direction.

11. A method of controlling a three dimensional numerically controlled electroerosion process, comprising the steps of:

using an elongate electrode to electroerosively shape an electrically conductive workpiece according to a predetermined program;

controlling the electrode to move progressively in discrete steps axially along a Z-axis lying coaxial with the longitudinal axis of the electrode, and after each step to cause the end portion of the electrode to move stepwise in an X-Y plane extending at the right angles to the Z-axis to follow the desired contour for the workpiece in that plane;

storing the X-Y coordinates in the said X-Y plane defining the last section of path in the said plane just traversed by the end portion of the electrode;

detecting a fault condition in the gap between the electrode and the workpiece and in response to the said detection;

retracting said electrode simultaneously along the Z-axis in a direction opposite to that in which the electrode is being stepped and in the X-Y plane in a direction generally at right angles to said last section of path and away from the workpiece.

* * * * *